(12) United States Patent
Eyole et al.

(10) Patent No.: US 11,042,375 B2
(45) Date of Patent: Jun. 22, 2021

(54) COUNTING ELEMENTS IN DATA ITEMS IN A DATA PROCESSING APPARATUS

(71) Applicant: ARM Limited, Cambridge (GB)

(72) Inventors: Mbou Eyole, Cambridge (GB); Jesse Garrett Beu, Austin, TX (US); Alejandro Martinez Vicente, Cambridge (GB); Timothy Hayes, Cambridge (GB)

(73) Assignee: ARM Limited, Cambridge (GB)

( * ) Notice: Subject to any disclaimer, the term of this patent is extended or adjusted under 35 U.S.C. 154(b) by 286 days.

(21) Appl. No.: 15/665,781

(22) Filed: Aug. 1, 2017

(65) Prior Publication Data

US 2019/0042253 A1 Feb. 7, 2019

(51) Int. Cl.
*G06F 9/30* (2018.01)
(52) U.S. Cl.
CPC ...... *G06F 9/30076* (2013.01); *G06F 9/30021* (2013.01); *G06F 9/30036* (2013.01); *G06F 9/30109* (2013.01); *G06F 9/30145* (2013.01)
(58) Field of Classification Search
None
See application file for complete search history.

(56) References Cited

U.S. PATENT DOCUMENTS

| 4,307,377 | A | 12/1981 | Pferd |
| 4,991,134 | A | 2/1991 | Ivsin |
| 5,608,662 | A | 3/1997 | Large et al. |
| 7,233,265 | B2 | 6/2007 | Cockburn |
| 7,299,282 | B2 | 11/2007 | Sarkissian et al. |
| 7,908,457 | B2 | 3/2011 | Amdt |
| 2004/0199630 | A1 | 10/2004 | Sarkissian |
| 2005/0086234 | A1 | 4/2005 | Tosey |
| 2014/0189320 | A1* | 7/2014 | Kuo ...................... G06F 9/3001 712/222 |
| 2014/0281371 | A1 | 9/2014 | Thantry |

OTHER PUBLICATIONS

International Search Report and Written Opinion of the International Searching Authority dated Sep. 25, 2018 in PCT/GB2018/051897, 13 pages.
U.S. Appl. No. 15/665,715, filed Aug. 1, 2017, Inventor: Vicente et al.

(Continued)

*Primary Examiner* — Corey S Faherty
(74) *Attorney, Agent, or Firm* — Nixon & Vanderhye P.C.

(57) ABSTRACT

An apparatus and method of operating the apparatus are provided for performing a count operation. Instruction decoder circuitry is responsive to a count instruction specifying an input data item to generate control signals to control the data processing circuitry to perform a count operation. The count operation determines a count value indicative of a number of input elements of a subset of elements in the specified input data item which have a value which matches a reference value in a reference element in a reference data item. A plurality of count operations may be performed to determine a count data item corresponding to the input data item. A register scatter storage instruction, a gather index generation instruction, and respective apparatuses responsive to them, as well as simulator implementations, are also provided.

16 Claims, 15 Drawing Sheets

(56) References Cited

OTHER PUBLICATIONS

Office Action dated Dec. 26, 2018 in co-pending U.S. Appl. No. 15/665,715, 21 pages.
Robert Bedichek, "Some Efficient Architecture Simulation Techniques", Winter 1990 USENIX Conference, 13 pages.
Final Office Action dated Aug. 7, 2019 in co-pending U.S. Appl. No. 15/665,715, 26 pages.
Notice of Allowance dated Feb. 12, 2020 in co-pending U.S. Appl. No. 15/665,715, 9 pages.

* cited by examiner

COUNTING ELEMENTS IN DATA ITEMS IN A DATA PROCESSING APPARATUS

TECHNICAL FIELD

The present disclosure relates to a data processing apparatus. More particularly it relates to the counting of elements in data items by the data processing apparatus.

BACKGROUND

A data processing apparatus may perform a great variety of data processing operations, some of which can require it to count elements in the data items which it processes. For example, such counting may form part of the handling of histogram data, where the input data item elements can each be assigned to a given histogram bin in order to build up such histogram data. Depending on the size of the histogram being built up, such processing may be relatively burdensome, either from the point of view of the processing required in order to correctly allocate a given input data item element to its corresponding histogram bin, or due to the number of memory accesses which are required in order to retrieve existing histogram data and to write back modified histogram data, or both.

SUMMARY

In one example there is provided an apparatus comprising: instruction decoder circuitry to decode instructions; and data processing circuitry to selectively apply vector processing operations specified by the instructions to an input data vector comprising a plurality of input data items at respective positions in the input data vector, wherein the instruction decoder circuitry is responsive to a count instruction specifying an input data item to generate control signals to control the data processing circuitry to: perform a count operation to determine a count value indicative of a number of input elements of a subset of elements in the specified input data item which have a value which matches a reference value in a reference element in a reference data item.

In another example, there is provided an apparatus comprising: instruction decoder circuitry to decode instructions; and data processing circuitry comprising register scatter storage circuitry, wherein the instruction decoder circuitry is responsive to a register scatter storage instruction specifying a scatter destination register, a scatter index vector, and a scatter data item to control the register scatter storage circuitry to perform a register scatter storage process to set each of a plurality of register element locations in the scatter destination register identified by the scatter index vector to contain a value of a corresponding element of the scatter data item.

In another example, there is provided an apparatus comprising: instruction decoder circuitry to decode instructions; and data processing circuitry comprising gather index generation circuitry, wherein the instruction decoder circuitry is responsive to a generation instruction specifying a scatter index vector comprising a plurality of scatter index values to control the gather index generation circuitry to perform a gather index generation operation to generate a gather index vector formed of a plurality of gather index elements each gather index element referenced by a respective index and containing a respective register element index value, wherein the generation operation performs a comparison operation for each of the plurality of gather index elements to compare the respective index with each of the plurality of scatter index values, wherein the comparison operation conditionally sets a register element index value of the respective gather index element based upon the result of a match condition, wherein the match condition requires one of the plurality of scatter index values to match the respective index value, and the respective register element index value of the respective gather index element is set to be the index of a most significant scatter index element for which the match condition is met.

In another example, there is provided a method of operating a data processing apparatus, comprising the steps of: decoding instructions; selectively applying vector processing operations specified by the instructions to an input data vector comprising a plurality of input data items at respective positions in the input data vector; and generating control signals in response to a count instruction specifying an input data item to control data processing circuitry to: perform a count operation to determine a count value indicative of a number of input elements of a subset of elements in the specified input data item which have a value which matches a reference value in a reference element in a reference data item.

In another example, there is provided an apparatus comprising: means for decoding instructions; means for selectively applying vector processing operations specified by the instructions to an input data vector comprising a plurality of input data items at respective positions in the input data vector; and means for generating control signals in response to a count instruction specifying an input data item to control means for performing a count operation to determine a count value indicative of a number of input elements of a subset of elements in the specified input data item which have a value which matches a reference value in a reference element in a reference data item.

In another example, there is provided a computer program for controlling a host data processing apparatus to provide an instruction execution environment comprising: instruction decoding program logic to decode instructions; and data processing program logic to selectively apply vector processing operations specified by the instructions to an input data vector structure comprising a plurality of input data item structures at respective positions in the input data vector structure, wherein the instruction decoding program logic is responsive to a count instruction specifying an input data item structure to generate control signals to control the data processing program logic to: perform a count operation to determine a count value indicative of a number of input elements of a subset of elements in the specified input data item structure which have a value which matches a reference value in a reference element in a reference data item structure.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
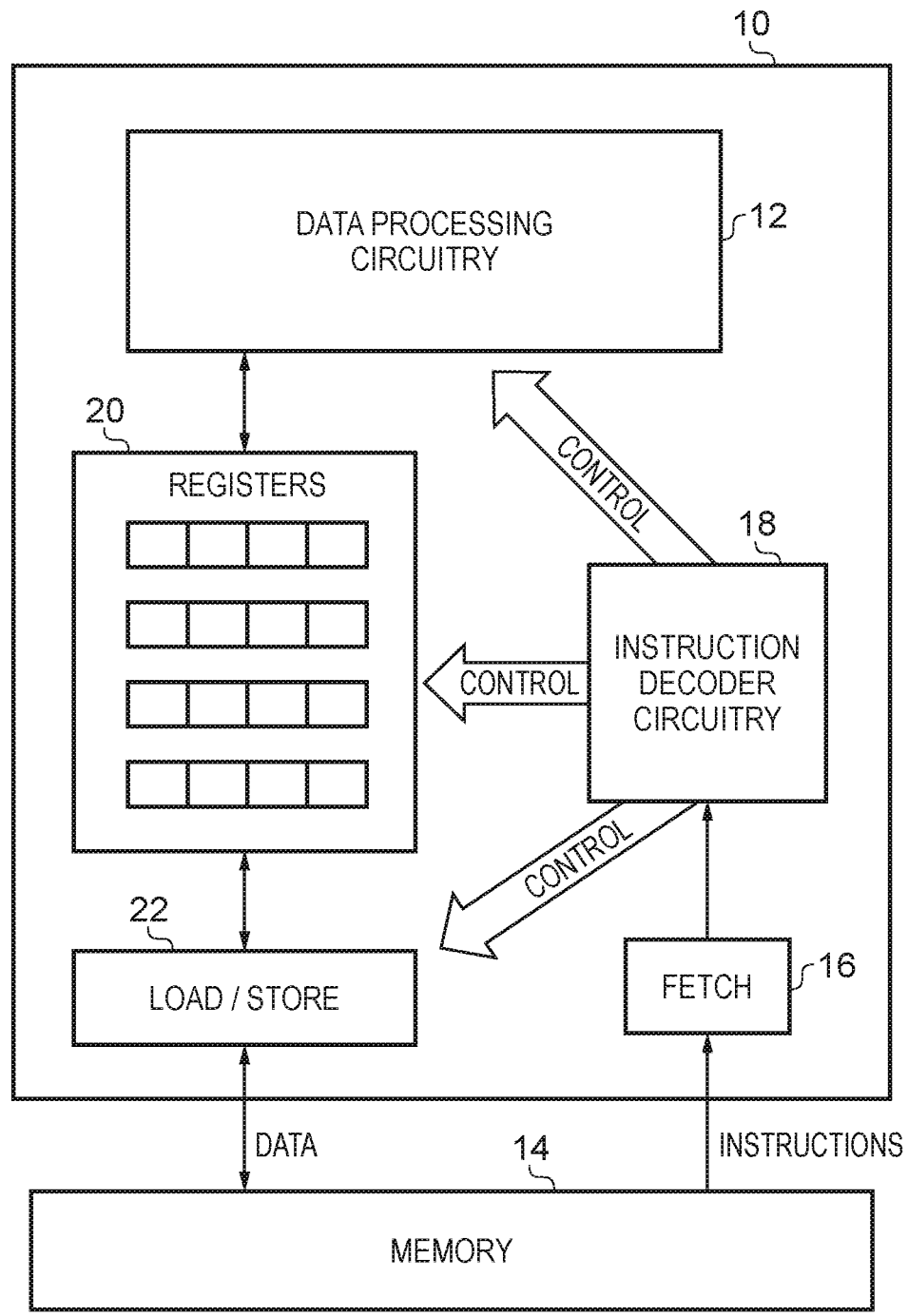
FIG. 1 schematically illustrates an apparatus according to one example.

At least some examples provide an apparatus comprising: instruction decoder circuitry to decode instructions; and data processing circuitry to selectively apply vector processing operations specified by the instructions to an input data vector comprising a plurality of input data items at respective positions in the input data vector, wherein the instruction decoder circuitry is responsive to a count instruction specifying an input data item to generate control signals to control the data processing circuitry to: perform a count operation to determine a count value indicative of a number of input elements of a subset of elements in the specified input data item which have a value which matches a reference value in a reference element in a reference data item.

A data processing apparatus may be required to count the number of elements which have a particular value in an input vector, i.e. an array of elements. An input data vector which is comprised of a plurality of input elements, which each contain a particular value, may for example be handled by a data processing apparatus when performing histogram operations. For example where the input data vector represents data which should be added to an existing histogram of values to which the data processing apparatus has access (e.g. stored in its memory), then a counting operation with respect to the elements of the input data vector will typically need to be carried out, so that these elements can be correctly accumulated in corresponding bins of the histogram. In order to support such operations the present techniques provides data processing circuitry which is responsive to a count instruction (mediated by control signals from instruction decoder circuitry) to count input elements in a input data item which match a reference value held in a reference element of a reference data item.

The reference data item may be provided in a variety of ways, and indeed can represent a variety of comparison items, depending on the manner in which the present techniques are being implemented. For example, the reference data item may be entirely distinct from the input data item in some examples, whilst in others the reference data item elements may indeed be provided by the input data item itself. The reference data item is not limited to comprising particular number of elements, and in some embodiments comprises a plurality of reference elements, whilst in others it indeed may contain only one reference element.

The present techniques recognise that a practical issue faced when providing such a data processing apparatus is that the complexity of the circuitry associated with performing the required counting operations becomes greater, the larger the input data item is, in particular due to the growing number of permutations of comparisons that must able to be performed between input data item and reference data item elements, to the extent that the provision of the required circuitry can become impractical. In this context the present techniques recognise that this issue can be addressed by providing data processing circuitry (controlled by the control signals generated by the instruction decoder circuitry) to determine a count value which is indicative of the number input elements in a subset of elements in the specified input data item which match a particular reference element in the reference data item. This subset may be variously defined, as will be discussed in more detail below, yet generally this approach provides that the circuitry required can be practically provided and the required counting operations carried out. This may, for example, enable histogram processing to be performed efficiently, where the input data item, the subset, and the reference data item are appropriately chosen.

In some examples, the data processing circuitry is further responsive to the control signals to perform a plurality of count operations, wherein in each of the plurality of count operations the reference value used is a respective reference value in a respective reference element of a plurality of reference elements in the reference data item. In other words, the reference elements of the reference data item are each compared to each input element in the input data item, and each count operation determines the number of the input elements in the input data item which match each respective reference element. Moreover, for each of the plurality of count operations the input elements in a respective subset of elements in the specified input data item are compared to the reference element used by the respective count operation, and the data processing circuitry determines the corresponding count value. In essence, the number of times each reference element matches an input element in a subset of an input data item is counted. It should be noted that this subset may be the same for each count operation, or may differ from count operation to count operation, lending useful configurability for different counting contexts to the present techniques, as will be described in more detail below.

In the example context of histogram processing, the efficiency of that histogram processing may therefore be improved, by facilitating the counting of input data item elements for selected subsets of histogram indices (bins). Various uses of this approach to the histogram context will be further described below, but may for example comprise targeted counting of selected, non-contiguous sets of histogram indices or iterative counting over selected, contiguous sets of histogram indices.

In some examples, the data processing circuitry is responsive to the control signals for each of the plurality of count operations to set the count value in a respective count element of a count data item to indicate the count value determined by that count operation. The count data item thus determined may then be used in various ways to further support the data processing, for example directly or indirectly updating a corresponding portion of a stored histogram.

In some examples, the subset of elements in the specified input data item comprises each input element of the input data item which has an element position in the input data item which is within a range of element positions in the input data item, wherein the range of element positions is bounded by the respective reference element used in each of the plurality of count operations. Each reference element has a reference element position in the reference data item and for each of the plurality of count operations performed by the data processing circuitry a respective reference element in a respective reference element position is used. The subset of elements in the specified input data item referred to above comprises those input data item elements which are used to determine the count value for the corresponding reference element. Accordingly, in such examples, the subset is determined with reference to the respective reference element used in each of the count operations. In particular, the reference position of the respective reference element in the reference data item is indicative of the range of element positions of the input elements within the subset of elements in the specified input data item. In other words, where the reference element being compared against is (in the reference data item) determines which of the input elements of the input data item are compared against it. In the context of a sequence of count operations being performed, this thus means that the subset changes for each, which the present techniques have identified as a useful approach to implementing such counting operations in a practical manner (i.e. one in which the complexity of the required circuitry does not become limiting). In particular, it has been found that, in certain circumstance, a set of comparisons can be performed which for example begins with just one comparison and grows over the course of the sequence to only become the full set of comparisons possible at the last iteration. This limits the complexity of circuitry which must be provided.

The range of element positions may be variously configured, but for example the range of element positions may be bounded by the input element with the highest order position in the input data item and the input element with an element position equal to a reference position of the reference element. Alternatively, the range of element positions may be bounded by the input element with the lowest order element position in the input data item and the input element with an element position equal to a reference position of the reference element.

In some examples, the range of element positions comprises the respective reference elements used in each preceding count operation of the plurality of count operations. The plurality of count operations may be performed in sequence such that each count operation is performed after a preceding count operation (with the exception of course of the first count operation). The range of element positions which specify the input elements to be used during each count operation can then include the reference elements used by each of any count operations which precede a current count operation, in addition to a current reference element. In other words, the sequential count operations perform counting with respect to a growing input element subset.

In some examples, the data processing circuitry is responsive to the control signals to perform the plurality of count operations in an ascending order of element positions from least significant element positions to most significant element positions. In other examples this ordering might be reversed, i.e. from most to least significant element positions.

Moreover, in some examples, the reference value in each reference element of the reference data item is provided by the input value in each corresponding input element of the input data item. In other words, the reference elements in the reference data item match the input elements in the input data item. This can for example be arranged, where the apparatus is responsive to a particular count instruction which specifies an input data item, by also treating that input data item as the reference data item. The present techniques recognise that in such situations, because each of the successive count operations is performed for a respective subset of elements in the specified input data items, the count value determined for a respective reference element may not indicate the total number of input elements in the input data item which match that input element. However, in the event that this is the case (for example, in a situation where there are more than one copies of a particular input element value in the input data item), a later count operation in the sequence can be relied on to perform a count that does indeed include all instances of the particular element value. In examples in which the reference data item matches the input data item, and where there are value repetitions in the input data item, earlier counts may be incomplete, but it can nevertheless be assured that when all count operations for the input data item are complete, the last count of a particular value will be correct. It can then be arranged that the apparatus, when using the set of count values generated, uses the earlier (incomplete) and later (complete) counts in a manner in which the later value supersedes or overwrites the earlier value. Alternatively, the apparatus may be set up so that the earlier value is ignored or skipped during a subsequent operation if there is a later value in a higher-order count element which corresponds to the same reference element.

In some examples, the input data item is comprised of one or more segments, wherein each segment has a predefined size, and the subset is a selected segment of the one or more segments. The subset of elements in the specified input data item can be a segment of the input data item. In some examples, the segments have a predetermined width, such as a width of 4 input elements. This width may be predefined and fixed, whilst in other examples its width may depend on a configuration which can be dynamically set.

In some examples, the input data item is comprised of one or more segments, wherein each segment has a predefined size, and the subset is a selected segment of the one or more segments, and wherein the subset is the selected segment for each count operation of the plurality of count operations. The subset of elements in the specified input data item which is used by the count operation to determine the count value is, in such cases, a segment from among a plurality of segments in the input vector. Each of the plurality of input data items contains one or more segments and the count operation is performed using a given segment. Each count operation for a respective reference element is then performed by counting the number of times the respective reference element matches an input element from among all of the input elements in the segment. This approach of segmenting the input data item enables the count operations required to be performed to be practically implemented, in other words although a full comparison of the (or each) reference element is made with each input element, the compartmentalisation of these comparisons to a segment of the input data item enables the hardware complexity to manageably constrained.

In some examples, the data processing circuitry is further responsive to the control signals to perform a plurality of count operations, wherein in each of the plurality of count operations the reference value used is a respective reference value in a respective reference element of a plurality of reference elements in the reference data item, wherein the data processing circuitry further comprises input data item copying circuitry to generate a copy of the selected segment of the input data item, and the data processing circuitry is responsive to the control signals to perform a first group of the plurality of count operations with reference to the selected segment of the input data item and to perform a second group of the plurality of count operations with reference to the copy of the selected segment of the input data item. Thus in some examples the number of reference elements comprised within the reference data item is greater than the number of input elements in the selected segment. In this situation the plurality of count operations can then be performed in groups, wherein a first group of count operations is performed on the selected segment of input elements and a second group of count operations is performed on a copy of the selected segment. For example, the apparatus may be provided with the ability to perform parallel comparisons with a set of elements of a reference data item which is an integer multiple longer than the segment of the input data item, and this parallelism may be taken advantage of by copying the input data item segment across that integer multiple width. For example, in the context of histogram processing, this approach can for example support the parallel counting of a large set of histogram bin contributions from a segment of an input data item, where that segment is this integer multiple shorter than the width of that large set.

In some examples, the plurality of reference elements in the reference data item are retrieved from memory in a contiguous load. The reference data item for each count operation comprises reference elements which, in some cases, are thus loaded from memory from sequential addresses. In other examples the plurality of reference elements in the reference data item are retrieved from memory by a gathering load, where the plurality of reference elements are stored at non-contiguous addresses in the memory. In other examples the reference data items are retrieved from one or more registers in a contiguous access.

In yet other examples the reference data items are retrieved from one or more registers in a non-contiguous access.

In some examples, the data processing circuitry further comprises summing circuitry to perform a summing operation and the instruction decoder circuitry is responsive to a summing instruction specifying a current sum vector to control the summing circuitry to perform a summing operation using the current sum vector to add the value of each count element in the count data item to the value in the corresponding element of the current sum vector and output a resultant data item. Thus, the count elements in the count data item determined by successive count operations can then be added to a current sum vector. This current sum vector can for example be loaded from memory, the current count data item added to it, and then written back to memory.

The summing operation performed by the summing circuitry adds the count value in each count element of the count data item to a respective current sum value in each current sum element of the current sum vector. In some examples, the current sum vector comprises a plurality of current sum data items which each comprises a plurality of current sum elements and correspond to a reference data item. Efficient processing is therefore supported by allowing multiple current sum data items to be summed (before say being written back to memory). The summing operation may be performed upon completion of the plurality of count operations.

In some examples, the data processing circuitry further comprises register scatter storage circuitry and the instruction decoder circuitry is responsive to a register scatter storage instruction specifying a scatter destination register, a scatter index vector, and a scatter data item to control the register scatter storage circuitry to perform a register scatter storage process to set each of a plurality of register element locations in the scatter destination register identified by the scatter index vector to contain a value of a corresponding element of the scatter data item. It is useful for the purposes of efficient data processing to access registers of the data processing apparatus in a targeted manner. Whilst it would be possible to access the whole of a given register, for example by reading the register content, modifying selected parts of that content, and writing the modified content back to the register, these embodiments support a more efficient and targeted access to the register in which only certain elements held in the register are accessed. This is referred to here as a "scatter operation" to scatter elements of a scatter data item to a plurality of register element locations in register circuitry which are not (necessarily) contiguous. The target register element locations are indicated by the scatter index vector and each scatter index of the scatter index vector indicates a register element location to be set to the value of the corresponding scatter data item. More efficient register access is thus supported. This can for example be useful in the context of histogram processing, where the histogram content, despite being held in registers, can be accessed in a non-contiguous manner, for example to allow only specified histogram bins to be accessed and updated (as determined by the (unpredictable) input data). Faster histogram processing can thus be supported.

In some examples, the register scatter storage instruction specifies more than one scatter destination register and a plurality of register element locations identified by the scatter index vector are comprised within the more than one scatter destination register. By specifying more than one scatter destination register it is possible to perform a register scatter operation across a plurality of registers rather than a single register. Accordingly it is possible to further improve the efficiency of data processing, and in particular histogram processing, by utilising the high-speed access of a register more effectively for the purposes of storing or accumulating histogram data.

At least some examples provide an apparatus comprising: instruction decoder circuitry to decode instructions; and data processing circuitry comprising register scatter storage circuitry, wherein the instruction decoder circuitry is responsive to a register scatter storage instruction specifying a scatter destination register, a scatter index vector, and a scatter data item to control the register scatter storage circuitry to perform a register scatter storage process to set each of a plurality of register element locations in the scatter destination register identified by the scatter index vector to contain a value of a corresponding element of the scatter data item.

In other words the present techniques propose that the above-mentioned register scatter storage instruction may also be provided independently of the above-mentioned counting techniques (and the apparatus to support them). This instruction can itself be useful in various other contexts, i.e. not only in the above discussed histogram processing context, indeed in any context where computation involves data value modification which is more complex than just incrementing. Further, the provision of such capability (and the register scatter storage instruction to trigger it) may also be usefully be provided in association with complementary register gathering capability, for which a register gathering instruction may be provided, to enable non-contiguous elements (also defined by an index—here a gather index) to be retrieved from a specified register.

In some examples, the apparatus further comprises gather index generation circuitry and the instruction decoder circuitry is responsive to a gather index generation instruction specifying a scatter index vector comprising a plurality of scatter index values to control the gather index generation circuitry to perform a gather index generation operation to generate a gather index vector formed of a plurality of gather index elements each gather index element referenced by a respective index and containing a respective register element index value, wherein the generation operation performs a comparison operation for each of the plurality of gather index elements to compare the respective index with each of the plurality of scatter index values, wherein the comparison operation conditionally sets a register element index value of the respective gather index element based upon the result of a match condition, wherein the match condition requires one of the plurality of scatter index values to match the respective index, and the respective register element index value of the respective gather index element is set to be the index of a most significant scatter index element for which the match condition is met.

In some examples there is thus provided gather index generation circuitry to generate a gather index based on a scatter index vector. This is based on the realisation that a scatter from a source register's perspective is equivalent to a gather from the destination register's perspective, yet with a different index directing those actions. The scatter index vector is a set of values which specifies the register element locations in at least one register and the gather index generation circuitry performs a generation operation to generate an equivalent gather index which can be used instead to perform the same movements of register elements in a gather operation. Where both the scatter and gather operations copy selected values from one or more source registers to one or more destination registers, the provision of this conversion capability thus enables a scatter-to-register(s) operation to be substituted by a gather-from-register(s) operation. For example this may be useful if the provision of bespoke register scattering circuitry is not deemed worthwhile, so that register scattering can nevertheless still be performed. For example index generation circuitry can be relatively low-cost to provide, and more complex bespoke register gather circuitry can be reused. Moreover, in some examples of the present techniques the ordering in which a set of values in a vector is stored can be important, where, say, it must ensured that a later ordered (correct) value written to a location is not corrupted by an earlier ordered (incorrect) value, which could occur if the ordering were not respected (also referred to here as "last-store-wins"). The ease of implementation of this rule can differ between register gathering and register storing (for example it may be harder to implement for the latter), thus providing further motivation to make use of the gather index generation techniques.

The gather index generation circuitry is arranged to compare each of the indices of a plurality of gather index elements with the values in each of a plurality of scatter elements (an index-value comparison is performed). A respective gather index element is set if one of the plurality of scatter index values matches the respective index. In other words if the content of an element of the scatter index matches the sequential index of an element of the gather index, the content of that element of the gather index is set to hold the sequential index of the element of the scatter index. If there is more than one match, the most significant scatter index element which has a value which matches the respective index is set as the respective register element index value of the respective gather index element.

At least some examples provide an apparatus comprising: instruction decoder circuitry to decode instructions; and data processing circuitry comprising gather index generation circuitry, wherein the instruction decoder circuitry is responsive to a gather index generation instruction specifying a scatter index vector comprising a plurality of scatter index values to control the gather index generation circuitry to perform a gather index generation operation to generate a gather index vector formed of a plurality of gather index elements each gather index element referenced by a respective index and containing a respective register element index value, wherein the generation operation performs a comparison operation for each of the plurality of gather index elements to compare the respective index with each of the plurality of scatter index values, wherein the comparison operation conditionally sets a register element index value of the respective gather index element based upon the result of a match condition, wherein the match condition requires one of the plurality of scatter index values to match the respective index, and the respective register element index value of the respective gather index element is set to be the index of a most significant scatter index element for which the match condition is met.

In other words the present techniques propose that the above-mentioned gather index generation instruction may also be provided independently of the above-mentioned counting techniques (and the apparatus to support them). This instruction can be useful in itself in various other contexts, and not only in the above discussed histogram processing context, indeed in any context where computation involves copying non-contiguous sets of values between registers.

At least some examples provide a computer program for controlling a host data processing apparatus to provide an instruction execution environment comprising: instruction decoding program logic to decode instructions; and data processing program logic to selectively apply vector processing operations specified by the instructions to an input data vector structure comprising a plurality of input data item structures at respective positions in the input data vector structure, wherein the instruction decoding program logic is responsive to a count instruction specifying an input data item structure to generate control signals to control the data processing program logic to: perform a count operation to determine a count value indicative of a number of input elements of a subset of elements in the specified input data item structure which have a value which matches a reference value in a reference element in a reference data item structure.

At least some examples provide a computer-readable storage medium storing in a non-transient fashion the computer program according any of the examples mentioned above.

Some particular embodiments are now described with reference to the figures.

FIG. 1 schematically illustrates a data processing apparatus 10 which may embody various examples of the present techniques. The apparatus comprises data processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18, which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detail description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. In particular the illustrated data processing apparatus is concerned with the performance of counting operations with respect to data elements held in the registers 20, further explanation of which will follow in more detail below with reference to some specific embodiments. Data values required by the data processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such as in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

Figure 2:
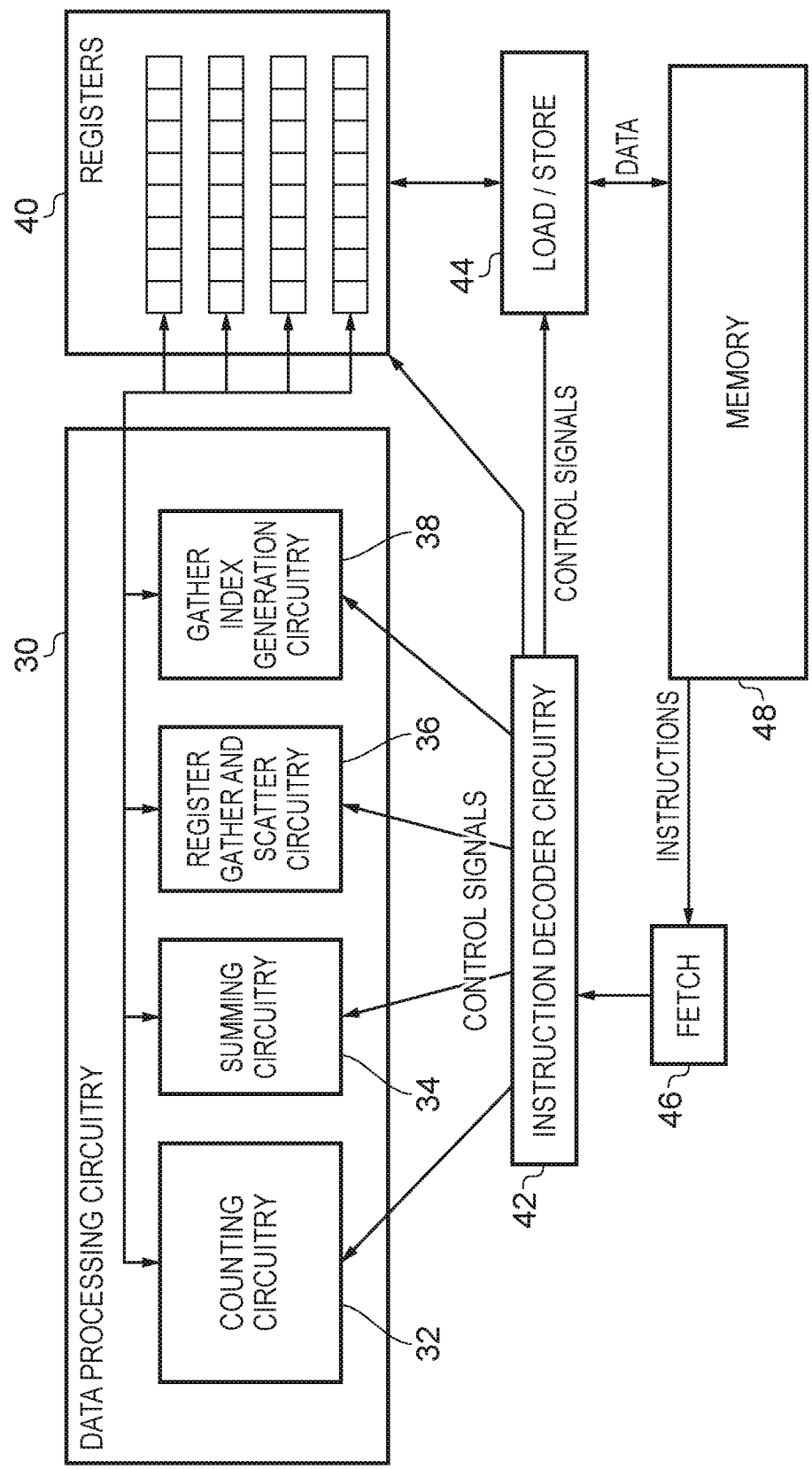
FIG. 2 schematically illustrates an apparatus according to one example.

FIG. 2 schematically illustrates some more detail of the components of a data processing apparatus in one embodiment. The data processing circuitry 30 of FIG. 2 is shown comprising some specific components, namely the counting circuitry 32, the summing circuitry 34, the register gather and scatter circuitry 36, and the gather index generation circuitry 38. As illustrated in the figure, these items of circuitry have access to the registers of the set of registers 40, where this access is under the control of the control signals generated by the instruction decoder circuitry 42. As was described above in connection with FIG. 1, a sequence of instructions are retrieved from memory 48 by the fetch circuitry 46 and passed to the instructor decoder circuitry 42, whilst the data values required by the data processing apparatus for the performance of its data processing operations are retrieved from the memory 48 by the load/store unit 44 and passed to the registers 40. Again, these transfers take place under the control of appropriate control signals generated by the instruction decoder circuitry 42. Each of the specific items of circuitry shown in FIG. 2 is provided to support various aspects of the present techniques, which will be described in further detail with respect of the figures which follow, but generally these items of circuitry access and modify the content of data values held in the registers 40, some of which are then written back to specified memory addresses by the load/store unit 44.

Figure 3:
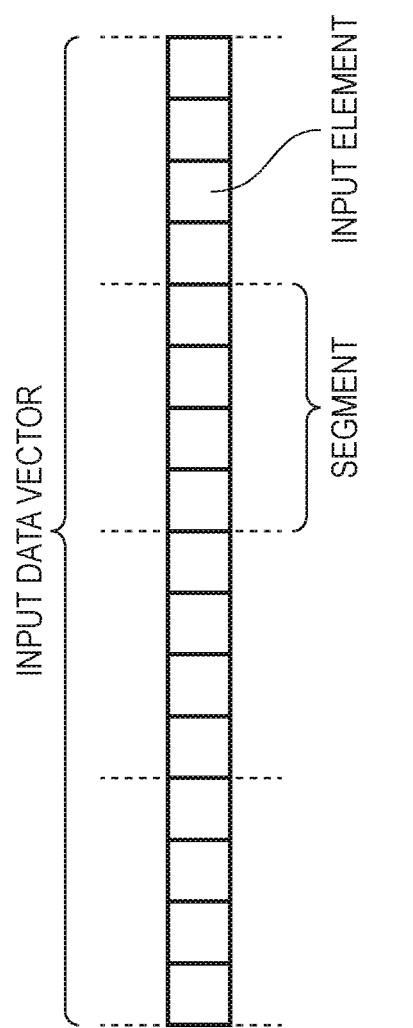
FIG. 3 illustrates an input data vector comprising a plurality of input elements in one example.

FIG. 3 is an illustration of an input data vector to graphically show some terminology used in this description, wherein it can be seen the input data vector comprises a plurality of segments, and wherein each segment comprises a plurality of input elements. In the example shown, each segment comprises 4 input elements. Hence for example, where the input data vector corresponds to the full content of a 512-bit vector register, this content may be treated in four 128-bit segments, each of which comprises four 32-bit values (input elements).

Figure 4:
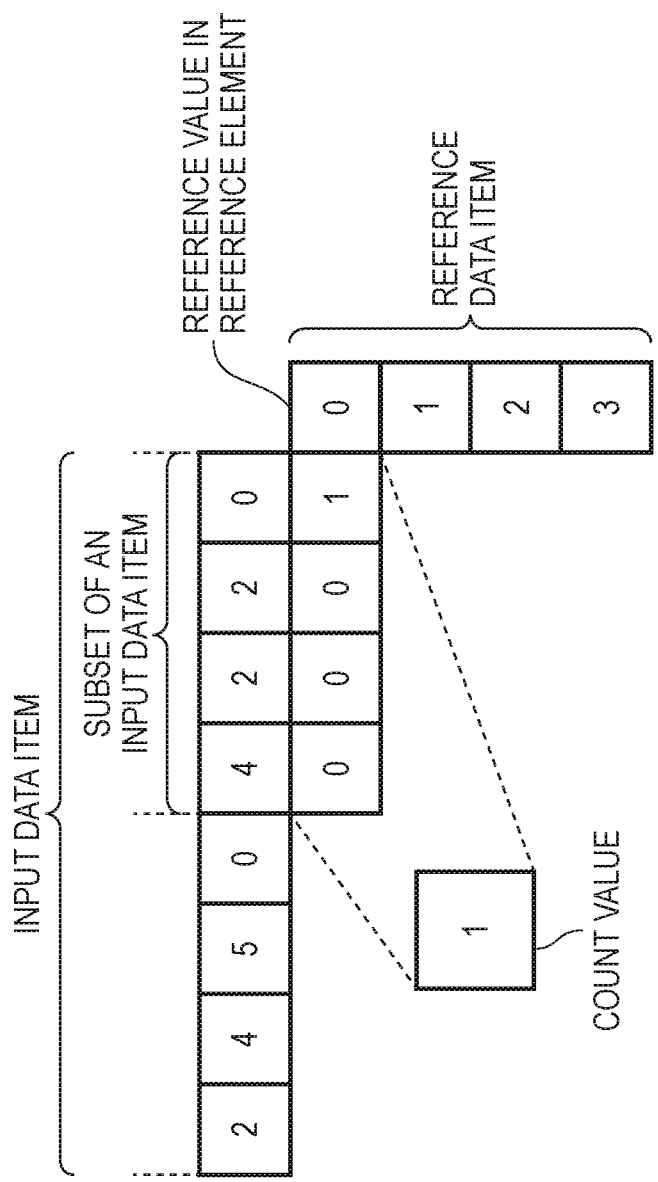
FIG. 4 illustrates a count operation to determine a count value corresponding to occurrences of a reference value in an input data item in one example.

FIG. 4 schematically illustrates a count operation performed by data processing circuitry in one embodiment. In particular, an input data item is shown comprising a subset (substring) of the input data item. Also shown is a reference data item comprising a plurality of reference elements each containing a reference value. A count value is determined by comparing each reference value in a respective reference element of the reference data item with each input element of the subset. Depending on the implementation this may be sequential or parallelised. Referring to the example shown, when the first reference element of the reference data item, containing the reference value "0", is compared with the first input element of the subset, containing the input value "0", the comparison is a match. Conversely when the first reference element is compared with the input value in each of the remaining input values of the subset, there is no match. Hence, the count value for the count operation illustrated is "1", since there is only one instance of the reference value "0" in the subset of input elements.

Figure 5:
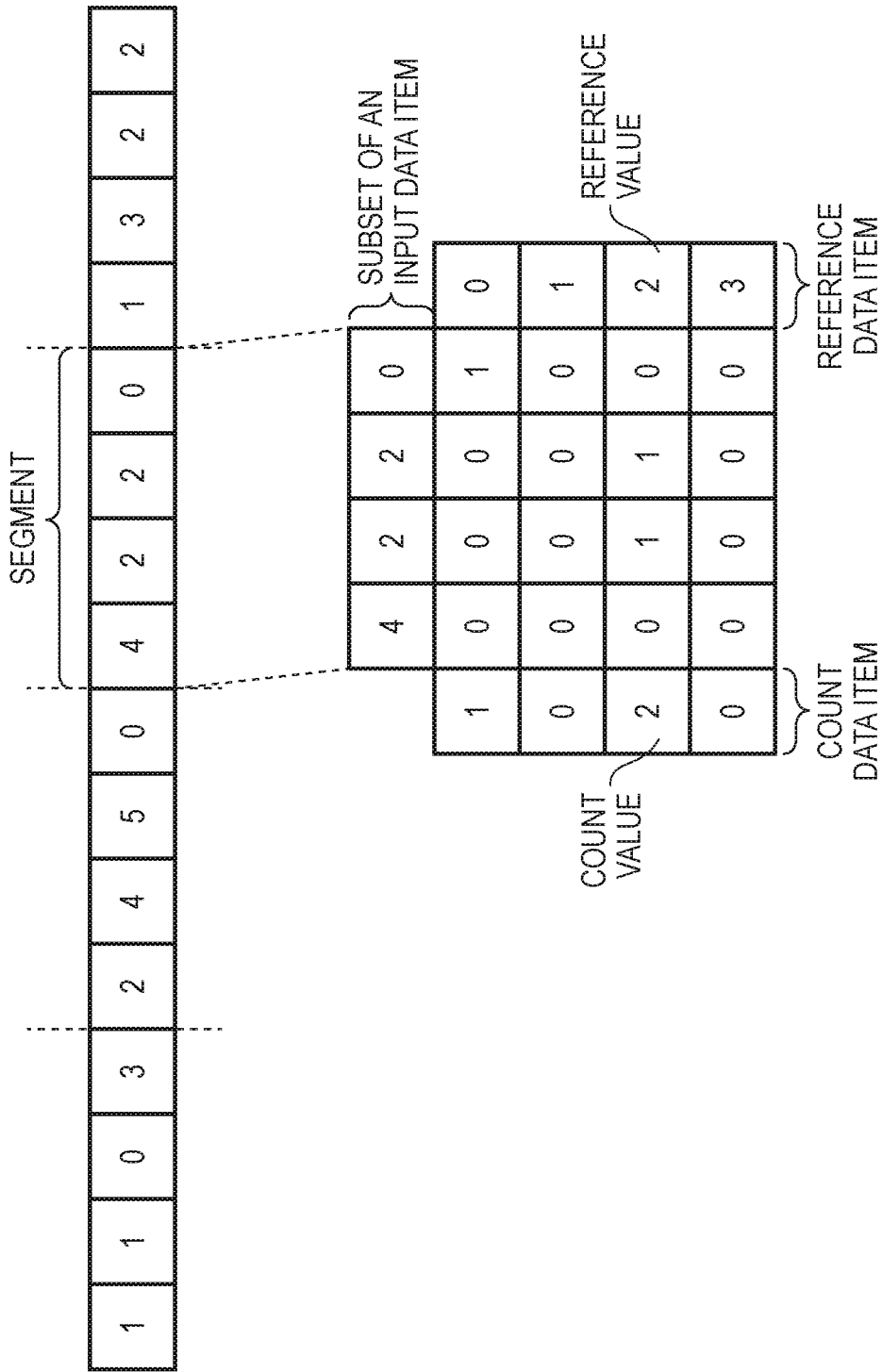
FIG. 5 illustrates a plurality of count operations according to one example to determine a count data item, the elements of which represent the number of occurrences of elements of a reference data item in a specified subset of an input data item.

FIG. 5 illustrates the behaviour of a plurality of count operations according to one example to determine a count data item corresponding to a reference data item and a subset of an input data item. In particular note that in this example the subset of elements in the specified input data item is a segment thereof, and in here the input data item is illustrated containing the set of input values [4 2 2 0] and a reference data item comprising a set of 4 reference values is shown which have the reference values [0 1 2 3]. The count operation as described previously with reference to FIG. 4 is performed for each reference value in a respective reference element of the reference data item. In respect of the second reference element with the reference value "1", since there are no input elements with an input value of "1" in the subset, the count value for that reference element is "0". This is also the case for the final reference element with reference value "3". However, since there are two instances of an input element in the subset with an input value of "2", the count value corresponding to the third reference element with a value "2" has a count value of "2". Accordingly, each count value indicates the number of input elements which contain an input value which matches the respective reference value. This set of operations shown are carried out in some embodiments in response to a "match segment" instruction (also referred to herein as "MATCHSEG") as will be described further below. The counting circuitry (item 32 in FIG. 2) provided to support these operations essentially comprises a matrix of sixteen comparators (corresponding to the central 4×4 grid in FIG. 5), such that comparisons between any of the input data item elements can be made with any of the reference data item elements, with the cumulative results of a row of comparators providing the count values illustrated in the left-most column (i.e. the count data item).

Figure 6:
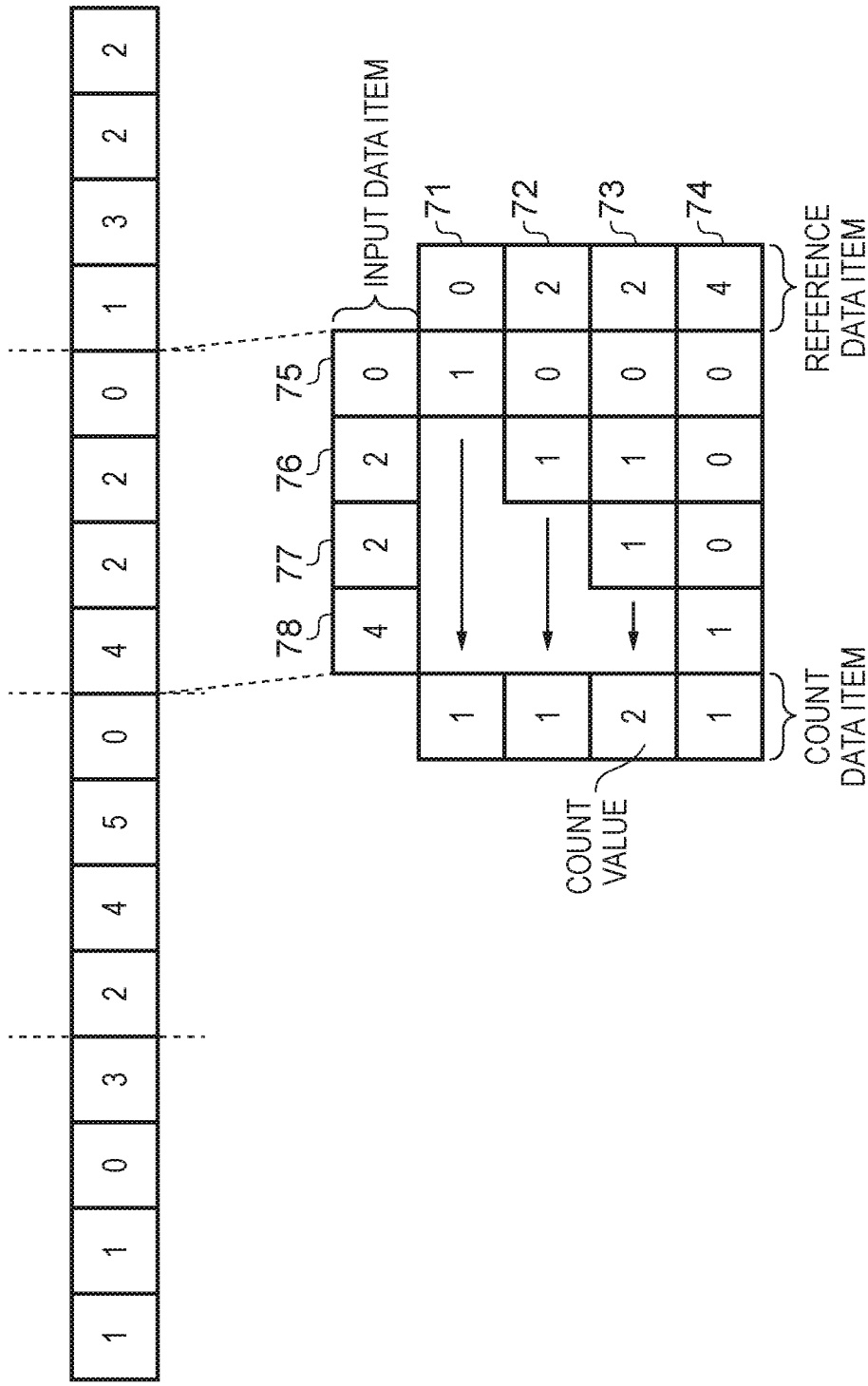
FIG. 6 illustrates a plurality of count operations according to one example to determine a count data item, the elements of which represent the number of occurrences of elements of a reference data item in respective subsets of an input data item.

FIG. 6 illustrates the behaviour of a plurality of count operations according to one example to determine a count data item corresponding to a reference data item and a subset of an input data item. In particular note that in this example the subset of elements in the specified input data item used by each successive count operation is shown to vary between the count operations. As illustrated a plurality of reference elements in a reference data item includes a first reference element 71, a second reference element 72, a third reference element 73, and a fourth reference element 74. In addition, a plurality of input elements are illustrated in an input data item, including a first input element 75, second input element 76, a third input element 77, and a fourth input element 78. Note also that the input data item and the reference data item have a one-to-one correspondence in this example, i.e. they are identical. The first count operation corresponding to the first reference element 71 uses a subset of elements in the specified input data item comprising only the first input element (containing the value "0"). For each successive count operation the range of reference elements is adjusted based on the position of the respective element used by a respective count operation. For example, the count operation corresponding to the third reference element 73 with a reference value "2" counts the number of input elements in the subset of elements in the specified input data item bounded by the third input element 77. Accordingly, the range of element positions is bounded by the respective reference element used in each of the plurality of count operations. This approach, where the input data item and the reference data item are the same, enables an counting operation to be carried out to determine the number of instances of each input data item value within that input data item. The incrementing set of comparisons made enables redundant comparisons to be avoided and an efficient determination of the required "number of instances" to be carried out. In examples where the values of the input data item are used to reference particular storage locations, the operations shown provide a mechanism via which the apparatus can disambiguate (rationalise) the input data items so that correct access to those storage locations is made. For example where the input data items represent indices of a histogram to be updated, the identification of multiple instances of a given index in the input data item enables the apparatus to ensure that accesses to the given index of the stored histogram are correctly carried out (e.g. by strict preservation of index ordering). The set of operations shown are carried out in some embodiments in response to a "match count" instruction (also referred to herein as "MATCHCNT") as will be described further below. Moreover, as in the case of FIG. 5, the counting circuitry (item 32 in FIG. 2) provided to support these operations may also comprise a matrix of sixteen comparators (corresponding to the central 4×4 grid in FIG. 5). Indeed in an apparatus responsive to both types of count instruction the same set of sixteen comparators may be used to carry out both types of counting. It will be recognised that in the example of FIG. 6 (by contrast to that of FIG. 5) not all possible comparisons between all of the input data item elements and all of the reference data item elements need be made, and for this purpose the control signals can cause the unused comparators temporarily to be disabled.

As mentioned above the present techniques may find useful application in the context of histogram processing. Some examples are now given in which the present techniques are applied to a histogram processing context. Histogram processing can be relevant to a range of applications such as in graphics processing, in computer vision processing, in server processing tasks such as sorting, and in many other high-performance computing contexts. One notable parameter which can significantly influence how the histogram processing is carried out is the size of the histogram. Here the "size of the histogram" refers in particular to the "width" of the histogram in the sense of the number of distinct bins which it comprises. However the size of the data which must be represented in each bin of course also contributes to the overall size of the histogram. A histogram with a relatively modest width may nonetheless require significant storage capacity if each of its bins is required to store large values. Equally a histogram with a large number of bins may nonetheless only require modest storage capacity if each of its bins is only required to store small values. The present techniques recognise that where the histogram is particularly large it may only be practical for the histogram entries to be stored in memory, and for updates to the histogram to be carried out by means of targeted memory accesses. For example rather than frequently retrieving, modifying and rewriting large sections of the histogram, gathering loads from memory and scattering stores to memory may be used to access and modify specific histogram entries. For "medium-sized" histograms that are nonetheless still too large to be held in registers, these may also be stored in memory, but can then be small enough to be accessed in a contiguous streaming manner. Finally, the present techniques recognise that some histograms may be small enough to be maintained in (or at least partially maintained) within registers, and provide techniques to enable the efficient processing of such histograms in registers.

Figure 7:
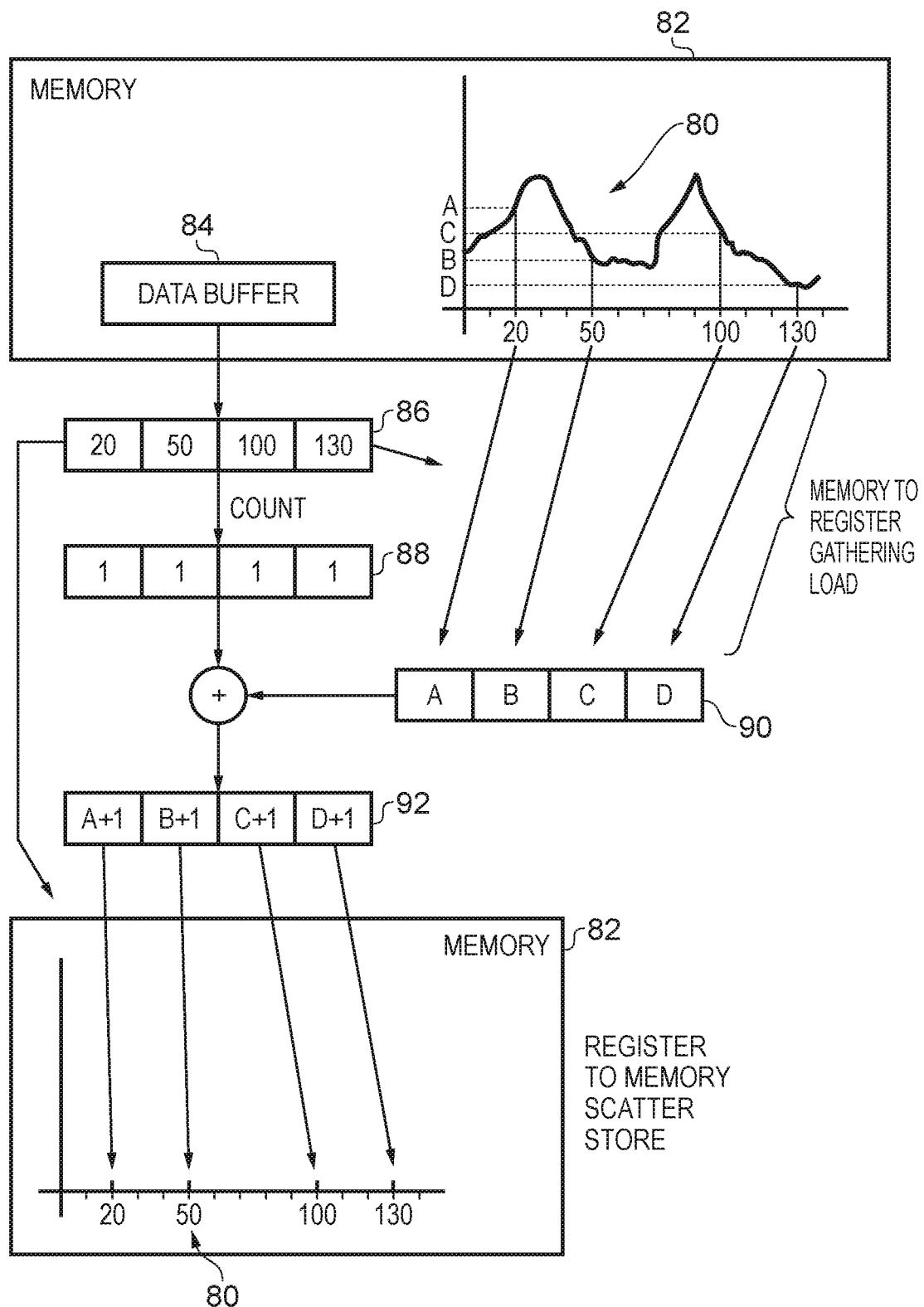
FIG. 7 schematically illustrates an input data item being retrieved from memory, a gathering load from memory to load corresponding histogram bin counts, accumulation of the input data item with the bin counts, and a scattering store to memory for the updated bin counts in one example.

FIG. 7 schematically illustrates data processing being performed with respect to a large histogram 80, which is stored in a memory 82. It will of course be appreciated that what is actually stored within the memory 82 is a large set of data values, each representative of the frequency count for each bin of the histogram 80, but a graphical representation thereof is shown in FIG. 7 for ease of visual recognition. Also shown to be stored in the memory 82 is data buffer 84 which temporarily holds data values for accumulation in the histogram. These data values for updating the histogram need not necessarily be retrieved from memory, and could for example result from other processing of data values in registers of the apparatus. FIG. 7 illustrates the data processing to enable this accumulation to take place. A data item 86 is received from the data buffer 84 and is the subject of a count operation to generate the set of count values 88 which should be added to the respective histogram bins. The data item 86 also controls the operation of a memory-to-register gathering load, by means of which the histogram entries (bin counts held at specific storage locations) for the set of four indices forming the data item 86 are loaded as set of data values 90 into a register. The set of count values 88 and the set of data values 90 are then summed (in summing circuitry) to generate an updated set of histogram entries 92. This is then the subject of a register-to-memory scattering store, also controlled by the data item 86, such that the updated set of histogram entries 92 is stored back into the specified histogram entries (bin counts held at specific storage locations) in memory 82.

Figure 8:
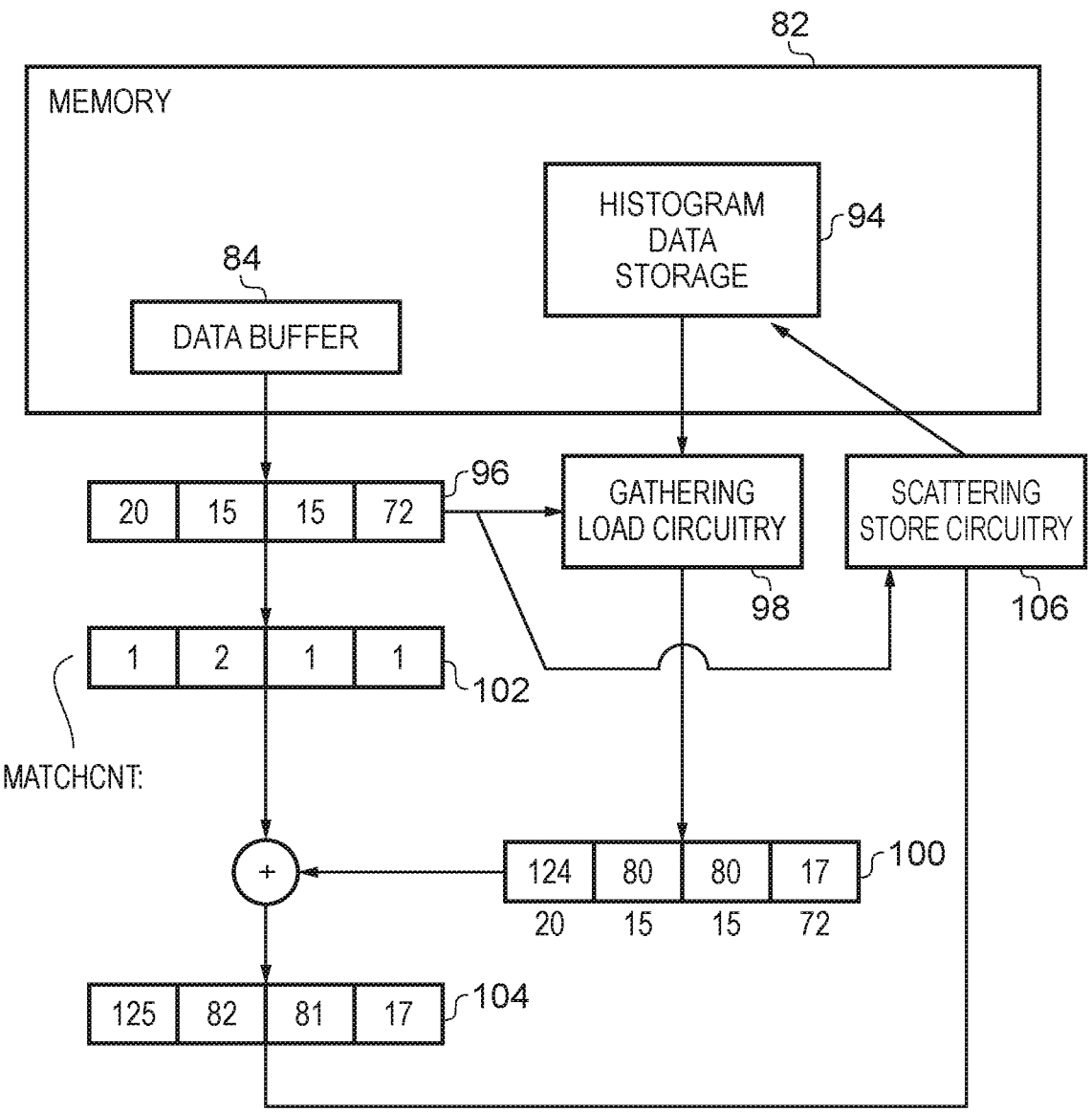
FIG. 8 schematically illustrates an input data item being retrieved from memory, a gathering load from memory to load corresponding histogram bin counts, accumulation of the input data item with the bin counts making use of a first count instruction of the present techniques, and a scattering store to memory for the updated bin counts in one example.

FIG. 8 schematically illustrates an example of the histogram processing discussed with reference to FIG. 7, where a "MATCHCNT" instruction of the present techniques is used to perform the counting step. Histogram data storage 94 is shown in memory 82 (in which a large histogram 80 is stored). An input data item 96 is received from the data buffer 84, which is subjected to the MATCHCNT instruction and also forms an input to the gathering load circuitry 98. In response the gathering load circuitry 98 retrieves the set of specified histogram entries 100 from the specified bins of the histogram. The MATCHCNT instruction generates the count vector 102. Note that, where the input data item has a repeated value (15), and where the multiple count operations performed in executing the MATCHCNT instruction proceed from least significant to most significant indices of a vector, the count of "1" for the first instance of 15 is superseded by the second count of "2". The set of count values 102 and the set of data values 100 are then summed (in summing circuitry) to generate an updated set of histogram entries 104. This is then the subject of a register-to-memory scattering store, performed by the scattering store circuitry 106 (also controlled by the data item 96), such that the updated set of histogram entries 104 is stored back into the specified histogram entries (bin counts held at specific storage locations) in memory 82. Note that the scattering store circuitry 106 (and any other components—not explicitly illustrated—involved in such a memory access) are configured to strictly respect the above-mentioned ordering of proceeding from least significant to most significant indices of a vector to ensure that the incorrect (or at least incomplete) histogram update of 81 is superseded or overwritten by the correct histogram update of 82 in the storage location corresponding to histogram index 15.

Figure 9:
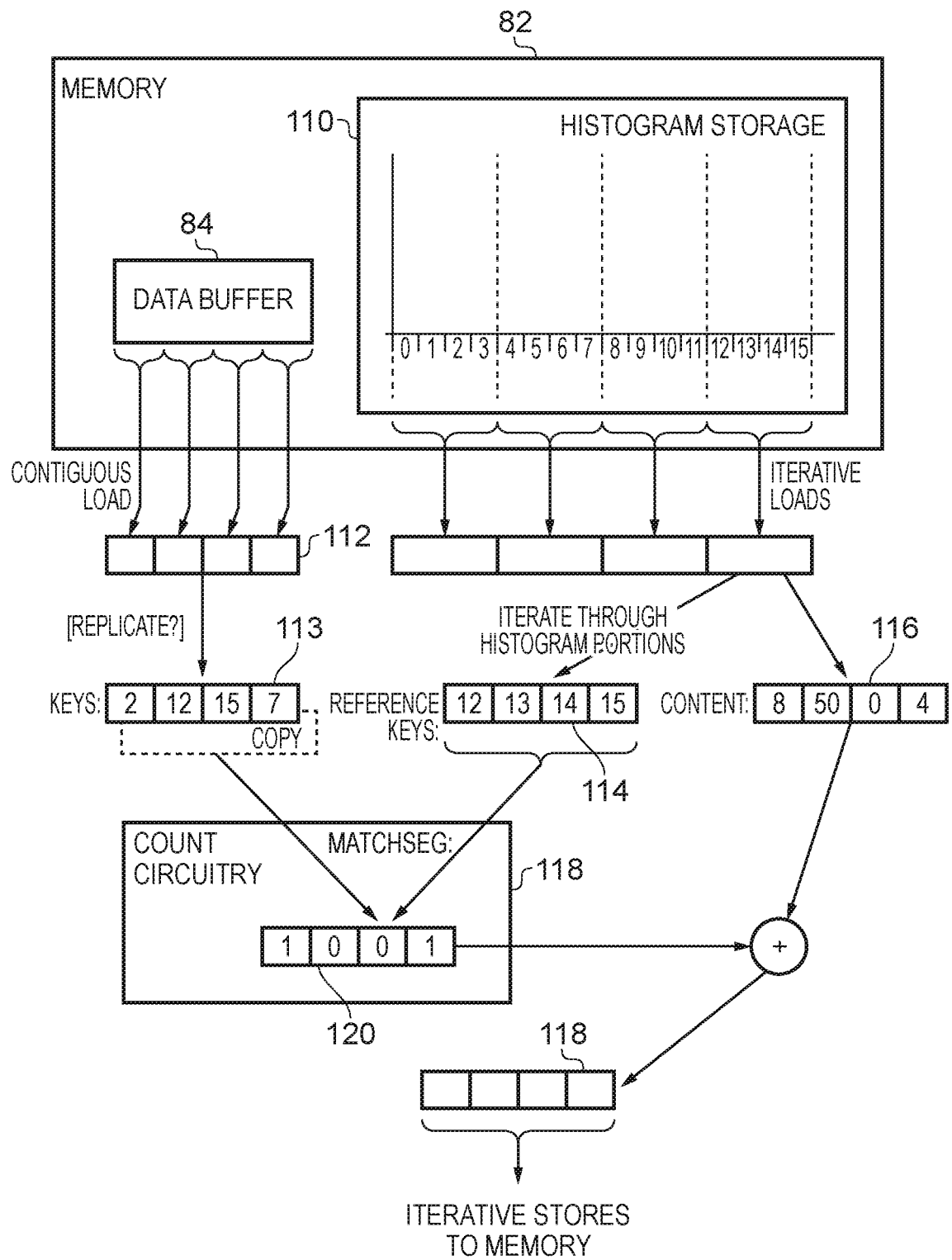
FIG. 9 schematically illustrates an input data item being retrieved from memory, a sequence of contiguous loads from memory to load a set of histogram bin counts, accumulation of the input data item with the relevant bin counts making use of a second count instruction of the present techniques, and a sequence of contiguous stores to memory for the updated bin counts in one example.

FIG. 9 schematically illustrates data processing being performed with respect to a "medium sized" histogram stored in histogram storage 110 of memory 82. As in the case of FIG. 7, what is actually stored within the memory 82 is a corresponding set of data values, each representative of the frequency count for each bin of this histogram, but a graphical representation thereof is shown in FIG. 9 for ease of viewing. Note that in FIG. 9 a histogram of relatively limited width is shown, having 16 bins. Also shown to be stored in the memory 82 is same data buffer 84 as in FIG. 7. FIG. 9 illustrates a different approach to the data processing (to that of FIGS. 7 and 8) to enable the accumulation into the histogram to take place. The data item 112 is loaded from the data buffer 84 (as a contiguous load) and this is transferre to represent a set of "keys" (i.e. histogram bins) 113. In parallel a load takes place to retrieve a first portion of the histogram content (e.g. bins 12-15, as illustrated) from memory. This provides two further items used in the processing, namely the set of reference keys 114 and the content of that portion of the histogram content 116. The input data keys 113 and the reference keys 114 form the two inputs to a count operation triggered by the MATCHSEG instruction in the count circuitry 118 (item 32 in FIG. 2). This generates the set of count values 120, which is summed with the set of values 116 representing the existing histogram content in this portion. The resulting updated set of histogram entries 118 is then the subject of a store to memory 82, such that the updated set of histogram entries 118 is stored back into the relevant portion. In a variation on the example of FIG. 9, it should be noted that the size of the input data item 112 and the size of the set of reference keys 114 need not be the same. The result of the MATCHSEG operation corresponds in length to the set of reference keys to indicate the respective counts of each reference key, but the input data item can, in principle, have any length. Where the length of the input data item underutilises the parallel counting capacity of the counting circuitry, where for example the count circuitry has the ability to perform more twice as many comparisons as those illustrated with the set of reference keys, then the input data item 112 can be copied (replicated) one or more times in providing the set of keys 113, such that the full parallel counting capacity is used.

Figure 10:
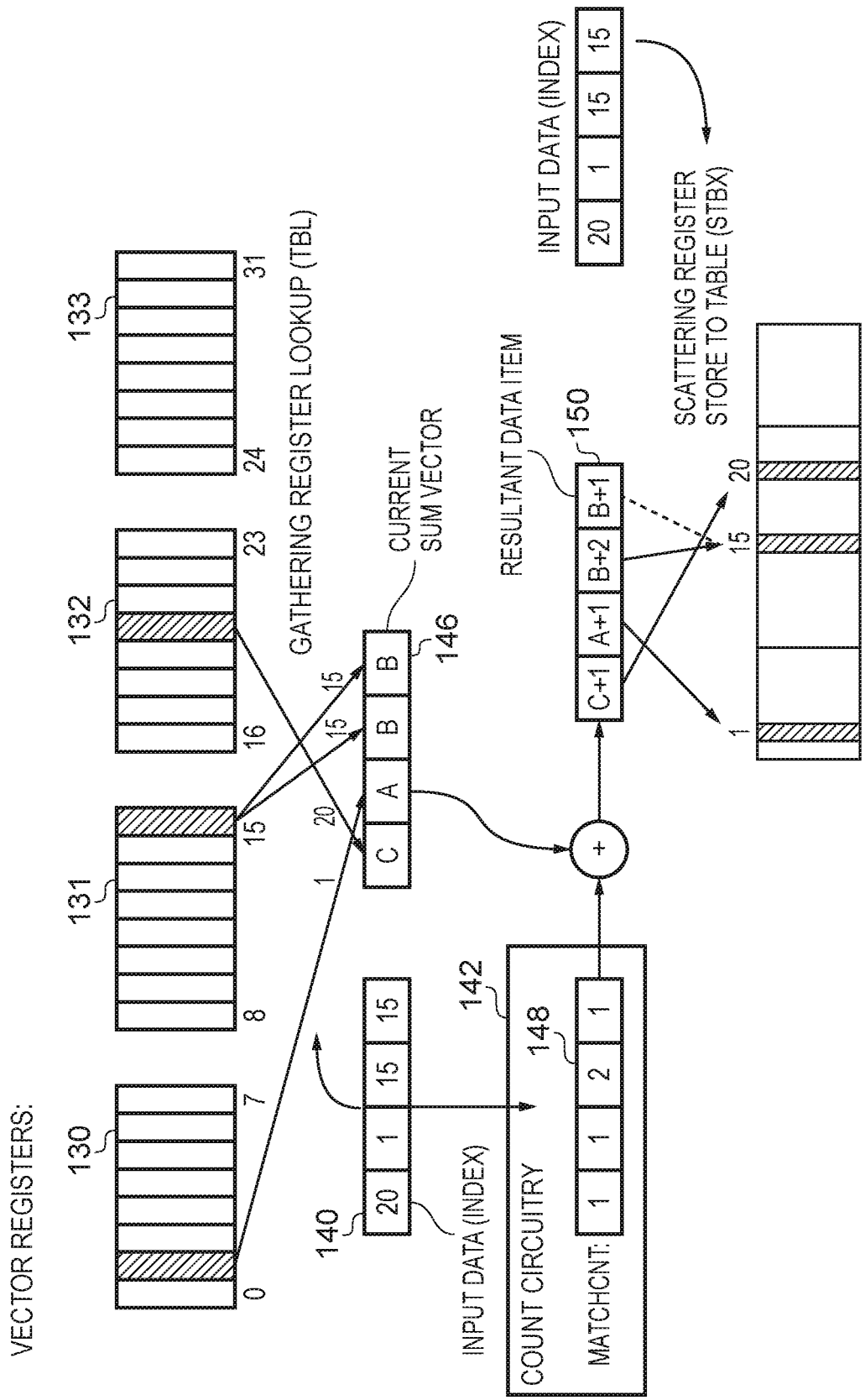
FIG. 10 schematically illustrates an input data index, a gathering register access to bring together a set of corresponding histogram bin counts, accumulation of the input data item with the bin counts making use of a first count instruction of the present techniques, and a scattering register access of the present techniques for the updated bin counts in one example.

FIG. 10 schematically illustrates data processing being performed with respect to a histogram which is small enough to be stored in the registers of the apparatus. Illustrated are four vector registers 130, 131, 132, and 133. The respective elements of each of these vector registers hold histogram bin entries across 32 bins. An input data item 140 is subjected to the MATCHCNT operation (in count circuitry 142) and also forms an input to the gathering register lookup (TBL) instruction. The TBL causes register gather circuitry (item 36 in FIG. 2) to retrieves a set of specified histogram entries 146 (also referred to as a current sum vector) from the specified, non-contiguous vector register elements (bins of the histogram). The MATCHCNT operation generates the count vector 148 and this is summed with the current sum vector 146 to generate a resultant data item 150. This is then the subject of a scattering register store, performed by the register scatter circuitry 106 (item 36 in FIG. 2) to cause the updated set of histogram entries to be stored back to the from the non-contiguous vector register elements (bins of the histogram) specified by the input data item. Such a scattering register store is initiated by the instruction STB (Store-to-table), although in this particular example a variant thereon, STBX, is used since the scatter spans multiple registers. Note that when (as shown in the example of FIG. 10) there is a repeated index in the input data item (i.e. 15), the scattering register store must respect the right-to-left (least significant to most significant index) of the input data item indices to ensure that the correct updated histogram entry (B+2) is not corrupted by an earlier incorrect update (B+1).

Figure 11:
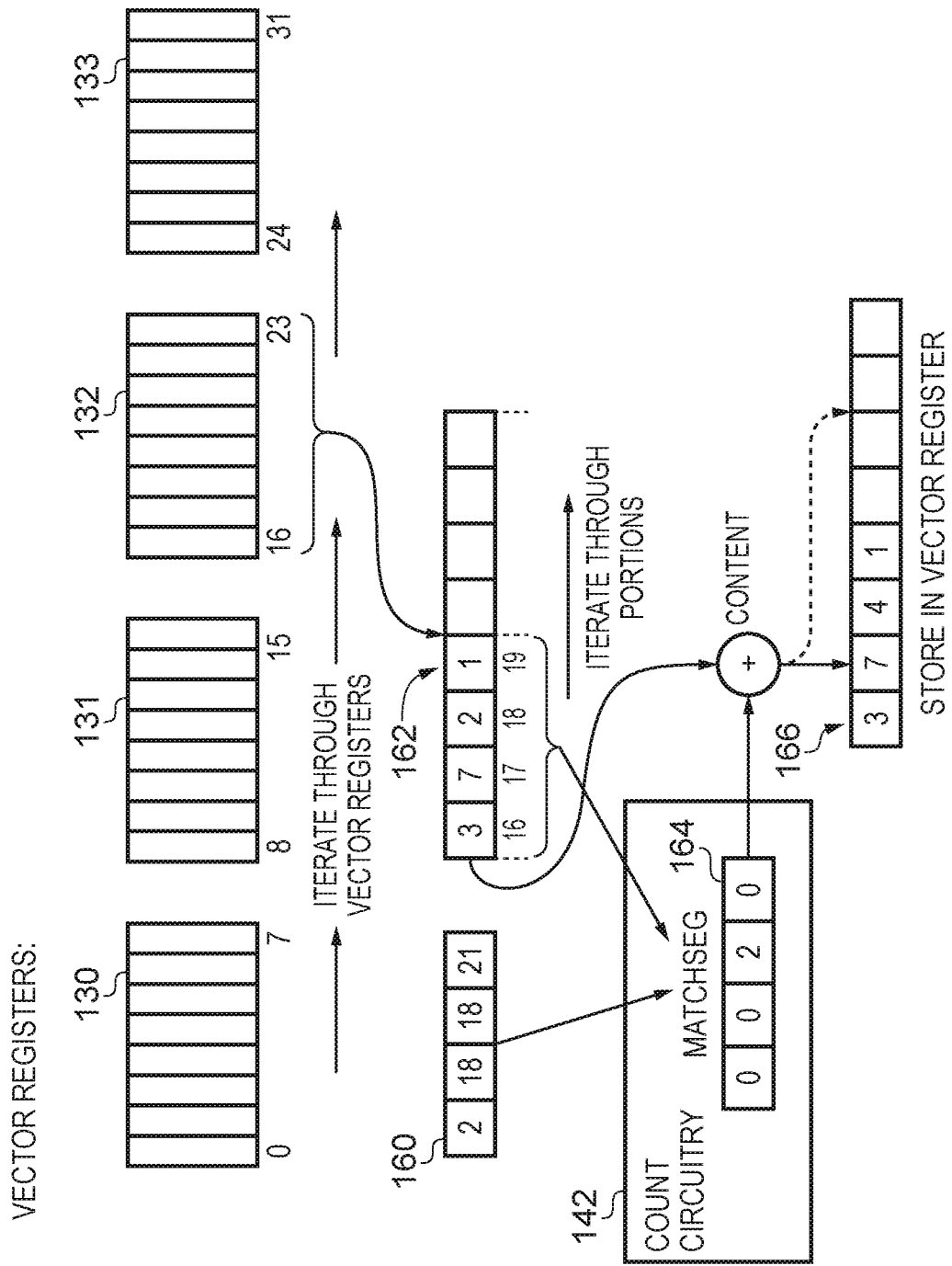
FIG. 11 schematically illustrates an input data index, a sequence of contiguous register accesses to corresponding histogram bin count portions, accumulation of the input data item with the bin counts making use of a second count instruction of the present techniques, and a contiguous register access with the updated bin counts in one example.

FIG. 11 schematically illustrates data processing being performed with respect to the same histogram as shown in FIG. 10, i.e. stored across four vector registers 130, 131, 132, and 133. In this example though, the histogram is deemed to be small enough that a contiguous access approach is taken, in which the content of each vector register is accessed as a contiguous unit 162 in turn, updated as necessary based on the input data item, and returned to the respective vector register. Further, where in this example the capacity of the MATCHSEG operation is for a reference data item which is half a vector register length, the content of each accessed vector register is also iteratively processed in two portions (halves). Thus the input data item 160 is subjected to the MATCHSEG operation (in count circuitry 142) with the respective portion of the current vector register content 162 forming the reference input. The MATCHSEG operation generates the count vector 164 and this is summed with the current portion of the vector register content 162 to generate a resultant data item 166. Once completed by the other portion, this is stored in the relevant vector register of vector registers 130, 131, 132, and 133.

Figure 12:
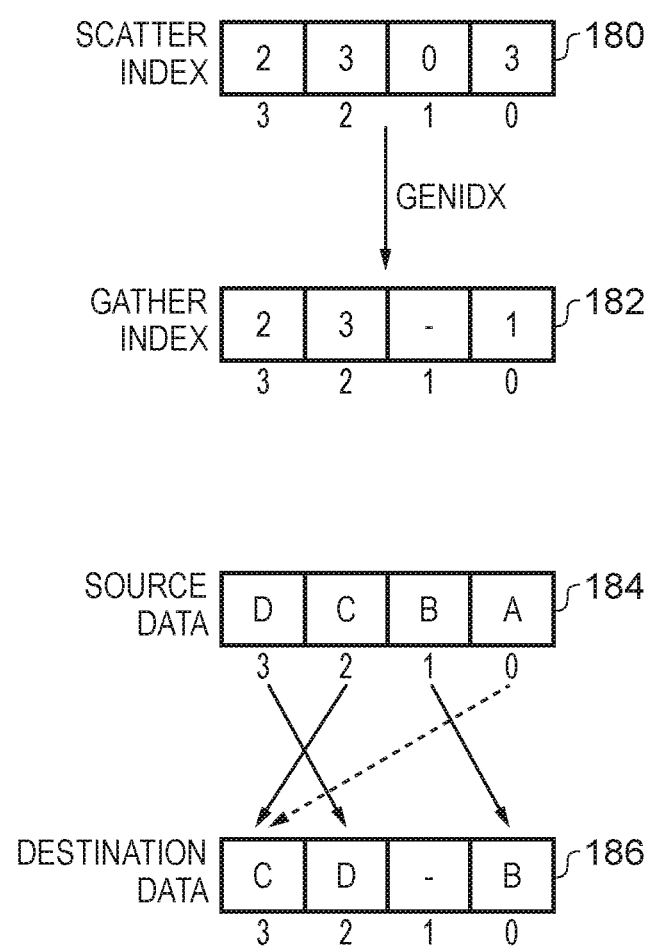
FIG. 12 illustrates the behaviour of a gather index generation instruction to generate a gather index from a scatter index in one example.

FIG. 12 illustrates a gather index generation operation performed by gather index generation circuitry (e.g. item 38 in FIG. 2) in response to a GENIDX instruction in one embodiment. A scatter index 180 is provided which comprises the scatter elements [2 3 0 3] and the gather index generation instruction (GENIDX) causes the generation of the gather index 182 illustrated. Refer also to the lower part of FIG. 12, showing the corresponding transfer of elements from one register to another, either as a scatter using scatter index 180 or as a gather using gather index 182. The process of generation of a gather index from a scatter index is described in more detail below with reference to the flow diagram of FIG. 13. Note also with reference to the lower part of FIG. 12, showing the transfer of elements, that an analogous issue here arises to that discussed with respect to the STB of FIG. 10, namely that the generated index ordering must respect the correct ordering of elements in the index (namely where higher/later indices take priority) for loop parallelisation reasons. Also caution is required with elements which are not indexed in the scatter index (e.g. element 1 in the FIG. 12 example), to ensure that a register gather which uses the gather index cannot corrupt any such elements. This can be resolved by the use of a predicate (to effectively "switch off" modification of certain elements, so that for example the use of gather index 182 cannot modify element 1 of the register into which it gathers) or by assigning an known out-of-range/maximum value to this element of the gather index (where it is also known that the response to the out-of-range/maximum value by the gather operation will be not modify the content of that target).

Figure 13:
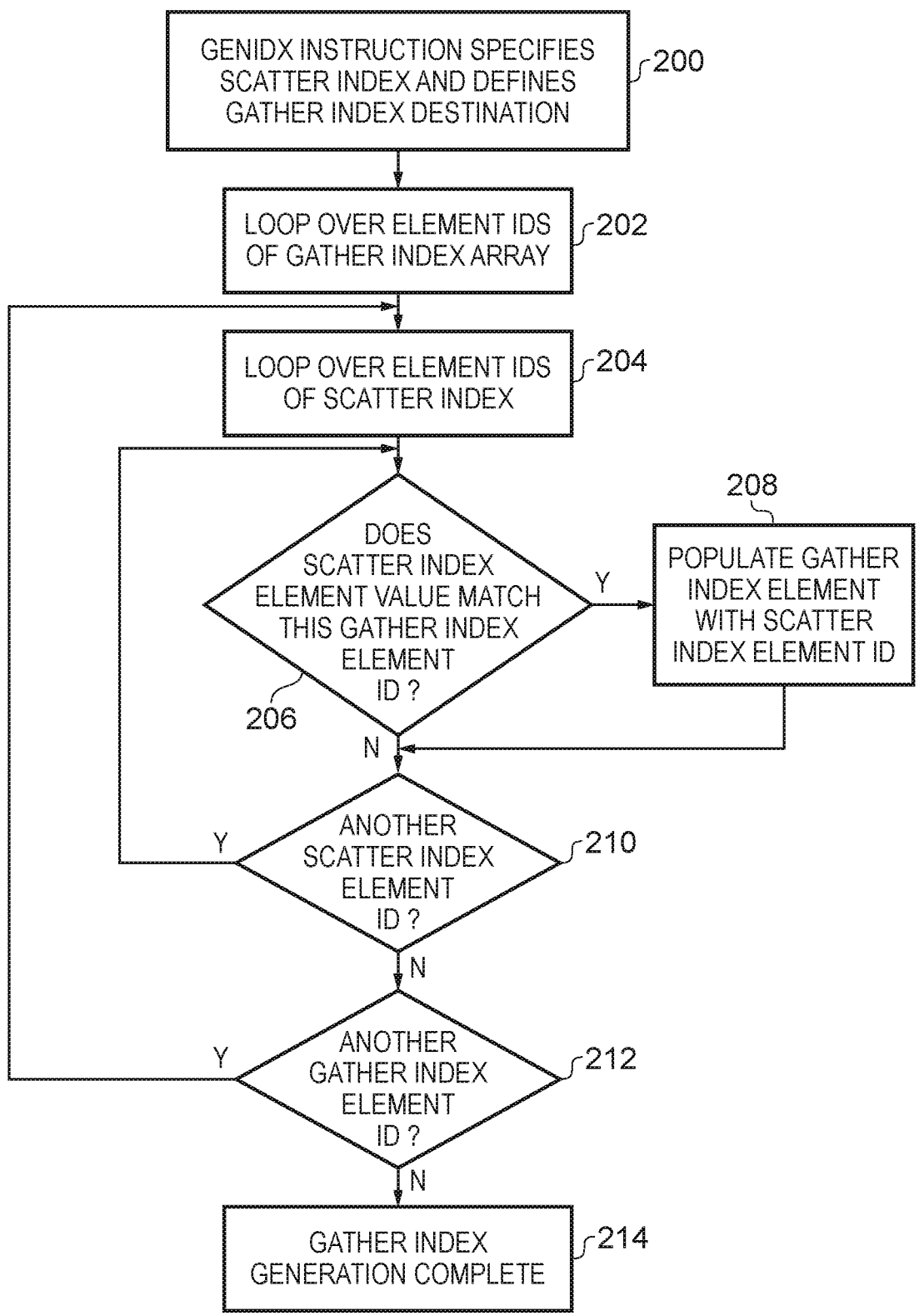
FIG. 13 illustrates a flow diagram showing a sequence of steps which are taken when executing the gather index generation instruction in one example.

FIG. 13 is a flow diagram showing the steps which are taken when generating a gather index from a scatter index in one example. The flow begins at step 200 with a GENIDX instruction which specifies a scatter index and the destination into which the generated gather index should be created. An outer loop is initiated at step 202 to loop over all element IDs in the gather index array to be generated. An inner loop is initiated at step 204 to loop over all element IDs of the scatter index being processed. Then at step 206 it is determined if the value stored in the current scatter index element (i.e. the value stored, not the ID of the element) matches the current element ID of the gather index. If it does, then the flow proceeds via step 208, where the current gather index element is populated with that scatter index element ID. If it does not, the flow proceeds directly to step 210, which continues the loop over scatter index element IDs. Thereafter step 212 continues the loop over gather index element IDs. Once the outer loop is complete, the flow concludes at step 214 and the gather index generation is complete.

Figure 14:
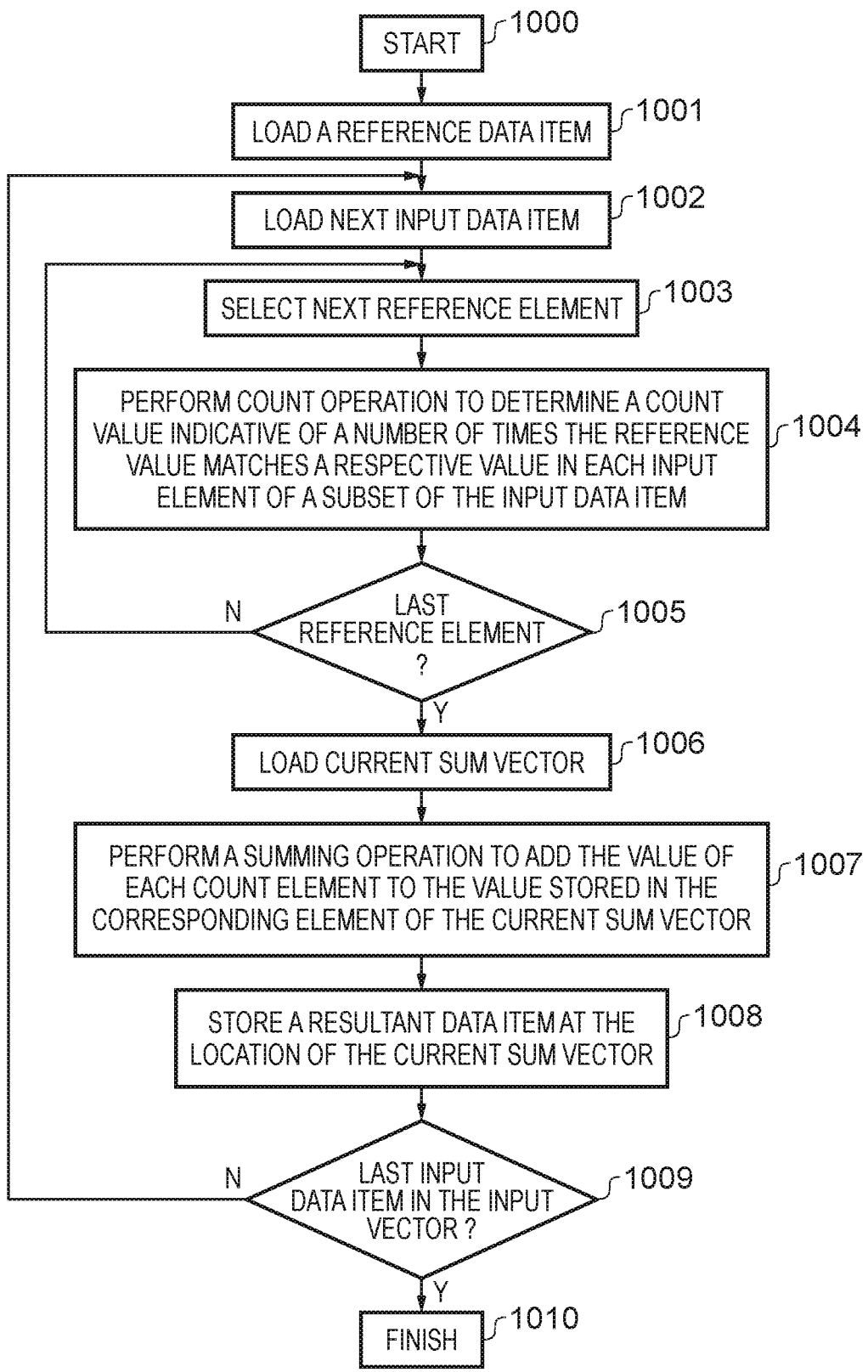
FIG. 14 illustrates a flow diagram showing a sequence of steps which are taken in the method of operating an apparatus according to one example.

FIG. 14 illustrates a flow diagram illustrating the method of operating an apparatus according to one example. The process begins at step 1000. A reference data item is loaded at step 1001. A first (next) input data item is loaded at step 1002. The process continues by selecting the next reference element at step 1003. At step 1004 a count operation is performed to determine a count value indicative of a number of times the reference value matches a respective value in each input element of a subset of elements in the specified input data item. Step 1005 determines whether the current reference element is the last reference element. If it is not, steps 1003-1004 are repeated until the condition in step 1005 is met. If the condition in step 1005 is met, the current sum vector is loaded 1006 and at step 1007 a summing operation is performed which adds the value of each count element to the value stored in the corresponding element of the current sum vector. Next, at step 1008, the resultant data item is stored at the location of the current sum vector. Finally, at step 1009, it is determined whether the input data item which steps 1002 to 1008 used is the last input data item to be processed in the input vector. If the condition in step 1009 is not met, steps 1002 to 1008 are repeated. If the condition of step 1009 is met, then the method finishes at step 1010.

Figure 15:
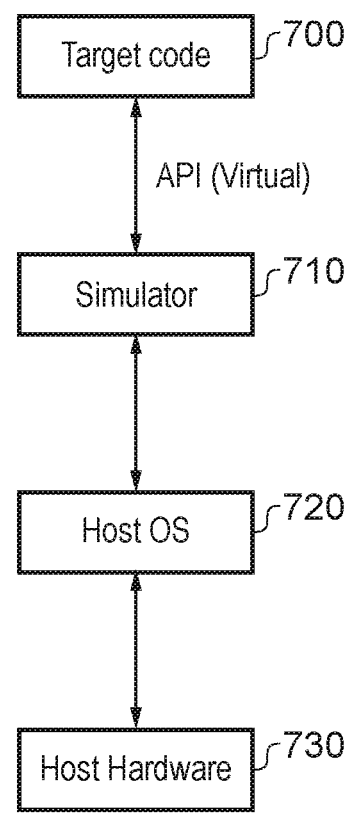
FIG. 15 schematically illustrates the components of a system which provides a simulator implementation in one embodiment.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include the applications, operating systems and a hypervisor as shown in FIG. 2) which is the same as the application program interface of the hardware architecture being modelled by the simulator program 710. Thus, the program instructions of the target code 700, including the count instructions, register scatter storage instructions, and the gather index generation instructions described above, may be executed from within the instruction execution environment using the simulator program 710, so that a host computer 730 which does not actually have the hardware features of the apparatus 2 discussed above can emulate these features.

In brief overall summary an apparatus and method of operating the apparatus are provided for performing a count operation. Instruction decoder circuitry is responsive to a count instruction specifying an input data item to generate control signals to control the data processing circuitry to perform a count operation. The count operation determines a count value indicative of a number of input elements of a subset of elements in the specified input data item which have a value which matches a reference value in a reference element in a reference data item. A plurality of count operations may be performed to determine a count data item corresponding to the input data item. A register scatter storage instruction, a gather index generation instruction, and respective apparatuses responsive to them, as well as simulator implementations, are also provided.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   instruction decoder circuitry to decode instructions; and
   data processing circuitry to selectively apply vector processing operations specified by the instructions to an input data vector comprising a plurality of input data items at respective positions in the input data vector,
   wherein the instruction decoder circuitry is responsive to a count instruction specifying an input data item to generate control signals to control the data processing circuitry to:
   perform a plurality of count operations, each of the plurality of count operations to determine a count value indicative of a number of input elements of a respective subset of elements in the specified input data item which have a value which matches a respective reference value in a respective reference element of a plurality of reference elements in a reference data item,
   wherein in each of the plurality of count operations, the respective subset of elements in the specified input data item comprises each input element of the input data item which has an element position in the input data item which is within a respective range of element positions in the input data item, and
   wherein in each of the plurality of count operations, the respective range of element positions is bounded by a position of the respective reference element used in the respective count operation of the plurality of count operations.

2. The apparatus of claim 1, wherein the data processing circuitry is responsive to the control signals for each of the plurality of count operations to set the count value in a respective count element of a count data item to indicate the count value determined by that count operation.

3. The apparatus of claim 1, wherein the range of element positions comprises the respective reference elements used in each preceding count operation of the plurality of count operations.

4. The apparatus of claim 1, wherein the data processing circuitry is responsive to the control signals to perform the plurality of count operations in an ascending order of element positions from least significant element positions to most significant element positions.

5. The apparatus of claim 1, wherein the reference value in each reference element of the reference data item is provided by the input value in each corresponding input element of the input data item.

6. The apparatus of claim 1, wherein the input data item is comprised of one or more segments, wherein each segment has a predefined size, and the subset is a selected segment of the one or more segments.

7. The apparatus of claim 1, wherein the input data item is comprised of one or more segments, wherein each segment has a predefined size, and the subset is a selected segment of the one or more segments,
   and wherein the subset is the selected segment for each count operation of the plurality of count operations.

8. The apparatus of claim 6, wherein in each of the plurality of count operations the reference value used is a respective reference value in a respective reference element of a plurality of reference elements in the reference data item,
   wherein the data processing circuitry further comprises input data item copying circuitry to generate a copy of the selected segment of the input data item,
   and the data processing circuitry is responsive to the control signals to perform a first group of the plurality of count operations with reference to the selected segment of the input data item and to perform a second group of the plurality of count operations with reference to the copy of the selected segment of the input data item.

9. The apparatus of claim 6, wherein the plurality of reference elements in the reference data item are retrieved from memory in a contiguous load.

10. The apparatus of claim 2, wherein the data processing circuitry further comprises summing circuitry to perform a summing operation and the instruction decoder circuitry is responsive to a summing instruction specifying a current sum vector to control the summing circuitry to perform a summing operation using the current sum vector to add the value of each count element in the count data item to the value in the corresponding element of the current sum vector and output a resultant data item.

11. The apparatus of claim 10, wherein the summing operation is performed upon completion of the plurality of count operations.

12. The apparatus of claim 2, wherein the data processing circuitry further comprises register scatter storage circuitry and the instruction decoder circuitry is responsive to a register scatter storage instruction specifying a scatter destination register, a scatter index vector, and a scatter data item to control the register scatter storage circuitry to perform a register scatter storage process to set each of a plurality of register element locations in the scatter destination register identified by the scatter index vector to contain a value of a corresponding element of the scatter data item.

13. The apparatus of claim 12, wherein the register scatter storage instruction specifies more than one scatter destination register and a plurality of register element locations identified by the scatter index vector are comprised within the more than one scatter destination register.

14. A method of operating a data processing apparatus, comprising the steps of:
decoding instructions;
selectively applying vector processing operations specified by the instructions to an input data vector comprising a plurality of input data items at respective positions in the input data vector; and
generating control signals in response to a count instruction specifying an input data item to control data processing circuitry to:
perform a plurality of count operations, each of the plurality of count operations to determine a count value indicative of a number of input elements of a respective subset of elements in the specified input data item which have a value which matches a respective reference value in a respective reference element in a plurality of reference elements in a reference data item,
wherein in each of the plurality of count operations, the respective subset of elements in the specified input data item comprises each input element of the input data item which has an element position in the input data item which is within a respective range of element positions in the input data item, and
wherein in each of the plurality of count operations, the respective range of element positions is bounded by a position of the respective reference element used in the respective count operation of the plurality of count operations.

15. An apparatus comprising:
means for decoding instructions;
means for selectively applying vector processing operations specified by the instructions to an input data vector comprising a plurality of input data items at respective positions in the input data vector; and
means for generating control signals in response to a count instruction specifying an input data item to control means for performing a plurality of count operations, each of the plurality of count operations to determine a count value indicative of a number of input elements of a respective subset of elements in the specified input data item which have a value which matches a respective reference value in a respective reference element a plurality of reference elements in a reference data item,
wherein in each of the plurality of count operations, the respective subset of elements in the specified input data item comprises each input element of the input data item which has an element position in the input data item which is within a respective range of element positions in the input data item, and
wherein in each of the plurality of count operations, the respective range of element positions is bounded by a position of the respective reference element used in the respective count operation of the plurality of count operations.

16. A non-transitory, computer-readable storage medium for providing, when executed by a data processing apparatus, an instruction execution environment comprising:
instruction decoding program logic to decode instructions; and
data processing program logic to selectively apply vector processing operations specified by the instructions to an input data vector structure comprising a plurality of input data item structures at respective positions in the input data vector structure,
wherein the instruction decoding program logic is responsive to a count instruction specifying an input data item structure to generate control signals to control the data processing program logic to:
perform a plurality of count operations, each of the plurality of count operations to determine a count value indicative of a number of input elements of a respective subset of elements in the specified input data item structure which have a value which matches a respective reference value in a respective reference element in a plurality of reference elements in a reference data item structure,
wherein in each of the plurality of count operations, the respective subset of elements in the specified input data item comprises each input element of the input data item which has an element position in the input data item which is within a respective range of element positions in the input data item, and
wherein in each of the plurality of count operations, the respective range of element positions is bounded by a position of the respective reference element used in the respective count operation of the plurality of count operations.

* * * * *